United States Patent Office 3,325,804
Patented June 13, 1967

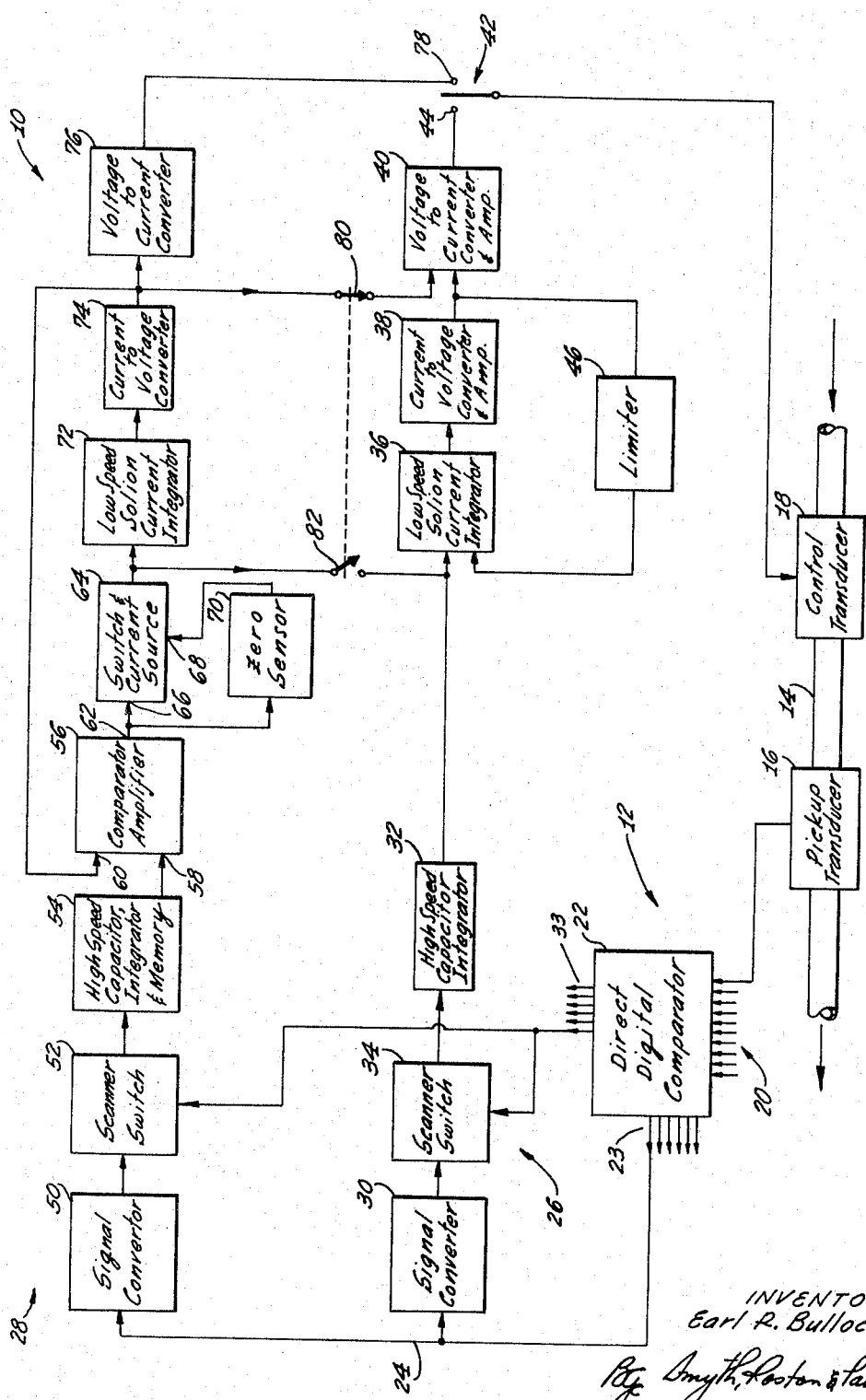

3,325,804
CONTROL SYSTEM
Earl R. Bullock, Palos Verdes Estates, Calif., assignor to Minnesota Mining and Manufacturing Company, St. Paul, Minn., a corporation of Delaware
Filed Apr. 14, 1964, Ser. No. 359,590
15 Claims. (Cl. 340—347)

The present invention relates to control means, and more particularly to means for converting an electrical error signal from one form into another form suitable for actuating a control mechanism.

Many industrial processes involve several different functions that must be simultaneously controlled with a high degree of accuracy. Such processes are frequently automatically regulated by a control system that monitors all of the functions and maintains them at predetermined levels. In some forms of control systems, a separate function signal is obtained from each function. This function signal which is proportional to the magnitude of the function is compared with a reference or set-point signal proportional to the magnitude at which the function should be maintained. The difference between the function and set-point signals is an error signal representing the amount of correction, if any, required to restore the function to the correct level. The "Control Means" disclosed and claimed in co-pending application Ser. No. 315,459, filed Oct. 11, 1963, in the name of Earl R. Bullock and Jerome D. Heibel and assigned of record to Minnesota Mining and Manufacturing Company is particularly adapted for accomplishing this type of control.

In control means of this type, a function signal and a reference signal are both converted into digital signals having a number or arrangement of discrete pulses which represent the magnitude of the signal. The two digital signals are then compared by adding or subtracting pulses to one of the signals until that signal equals the other signal. The number of pulses added or subtracted equal the difference between the two signals and form an error signal.

The output or error signal is employed to actuate a control device such as a proportional valve, etc., to modify the function until the error signal is reduced to zero whereby the function is maintained at the correct level. Normally, such control devices are incapable of responding to digital signals and must be actuated by analog signals. In addition, the digital error signal is of a transitory nature and disappears before the control device can respond and make the desired adjustment. As a result, it is frequently necessary to convert the digital error signal into an analog control signal suitable for actuating a control device and to perpetuate the analog signal for an adequate time to actuate the device.

Numerous means have been provided for converting digital signals into analog signals. However, few of them are suitable for use with a control system of the foregoing type. One signal converter particularly adapted for converting digital error signals into prolonged analog signals for use with a control system of the foregoing type is the "Converter" disclosed and claimed in copending application Ser. No. 310,227, filed Sept. 20, 1963, in the name of Earl R. Bullock and assigned of record to Minnesota Mining and Manufacturing Company.

In a signal converter of this type, the digital error signal is converted into a single pulse having a time duration proportional to the magnitude of the error. This extended pulse is then integrated by a long term or slow speed integrator such as a solion cell to produce a control signal. The resultant control is in part a function of the magnitude of the error and in part a function of the amount of time the error has existed. As a result, the control signal is an integral of the error signal. In the event of an abrupt change in the amount of error, the control signal does not abruptly charge in proportion thereto. Instead, the control signal is an integral of the error signal and gradually builds up to a magnitude proportional to the magnitude of the error. This form of control action is well suited to some types of industrial processes and particularly to processes where a time delay and gradual change of the functions is desired. However, in some types of processes, it is desirable to always set the magnitude of the functions at the reference or set point, irrespective of the rate of any changes in the functions. This will cause the function to be varied directly proportional to the magnitude of error and independently of time.

The present invention provides a controller that produces control signals that are directly proportional to the magnitude of an error signal and are effective to actuate a control device to vary a function in direct proportion to the error signal. The controller is also effective to provide a control signal that is partially directly proportional to the error and partially a function of an integral of the error. The controller includes a pair of slow speed or long term integrators such as solion cells. One of the integrators is charged in response to the integral of the error signal whereby it produces a first control signal that is slowly varying. The other integrator accumulates a charge directly proportional to the instantaneous value of the error signal and provides a second control signal that may vary rapidly in proportion to the error signal. The two control signals may be used separately or combined together in a predetermined proportion to provide a resultant control signal partly proportional to the integral of the error and partly proportional to the error.

These and other features and advantages of the present invention will become readily apparent from the following detailed description of control means embodying one form thereof, particularly when taken in connection with the accompanying drawing, wherein like reference numerals refer to like parts, and wherein:

The figure is a block diagram of a signal converter embodying one form of the present invention.

Referring to the drawings in more detail, the present invention is particularly adapted to be embodied in a control system 12. The present control system 12 is particularly adapted for regulating a process wherein a large number of functions are to be individually controlled in some predetermined relationship. The control system 12 includes a separate pickup for sensing the magnitude of each function and a separate control device for regulating the magnitude of each function.

For example, one of the functions in the process may include the rate of flow of a fluid through a conduit or pipe 14. A pickup transducer 16 is provided that senses the rate of flow through the pipe 14 and produces a signal proportional to the rate. A control transducer such as a value 18 is provided in the pipe 14 to control the rate of flow in proportion to the magnitude of a signal supplied thereto.

The pickup transducer 16, together with all of the other pickup transducers monitoring the other functions in the process, are interconnected with various inputs 20 to a digital comparator 22.

The comparator 22 employs time sharing multiplexing to produce separate error signals on the outputs 23 for each function. Each of the outputs 23 is connected to a separate output means 10 and the error signal fed therethrough whereby a control signal is supplied to the control transducer 18. This forms a separate closed loop for each function whereby each function will be maintained at its respective level.

The direct digital comparator 22 may be of any desired variety. However, in the present instance, it is substantially identical to the "Control Means" disclosed and claimed in the above-mentioned copending application Ser. No. 315,459.

Such a comparator 22 employs time sharing multiplexing for processing the various signals from the various pickup transducers such as transducer 16. Each of the pickup transducers produces an analog signal proportional to the magnitude of the function it monitors. The comparator 22 in sequence converts each of the analog function signals into a digital function signal and compares it with a corresponding digital set-point signal.

If a difference exists between the two signals, pulses are digitally added to or subtracted from one of the signals until the two signals are equal. The number of pulses that are added or subtracted equals the original difference between the two signals and therefore the error. Thus, each of the error signals from the comparator consists of a series or train of periodic voltage pulses. Each pulse is of equal significance whereby the total number of pulses or the duration of the pulse train is proportional to the magnitude of the error. The polarity of the pulses in the train indicate whether the error is positive or negative.

A separate output means 10 is provided for each of the functions to be monitored. Each of the output means 10 includes an input 24 interconnected with one of the outputs 23 of the comparator 22 and receives the error signals therefrom. The input 24 divides into two separate branches 26 and 28 and supplies the error signals to each branch.

The first branch 26 is substantially identical to the "Converter" disclosed and claimed in copending application Ser. No. 310,227. The first branch 26 includes a bipolar signal converter 30. This converter 30 may be of conventional design and is effective to change the incoming bipolar voltage pulses into current pulses.

The conversion from voltage pulses to current pulses may be accomplished by any suitable means. For example, a pair of transistors or similar devices may be interconnected in an opposed common base configuration to produce a bipolar current flow in response to the occurrence of a voltage pulse on the input. The converter 30 may provide a separate current pulse for each incoming voltage pulse. However, it is desirable for the duration of each current pulse to equal the interval between the voltage pulses. As a result, each error signal will be converted into a single current pulse having a time duration equaling the duration of the voltage pulse train.

If the error is in one direction, the voltage pulses will be of a first polarity and the current will flow in a first direction. If the error is in the opposite direction, the voltage pulses will be of a second polarity and the current will flow in the second direction.

The signal converter 30 includes a constant current source that is effective to maintain the rate of current flow constant. Thus, irrespective of the impedance into which the current is flowing or the voltage across the impedance, the current will be constant and the integral of the current will be proportional to its time duration.

The output from the converter 30 is connected to a high-speed integrator 32 for supplying the constant current pulses thereo. Although the signal converter 30 may be continuously connected directly to the integrator 32, in the present instance, the control system 12 and particularly the comparator 22 employs time sharing multiplexing to permit monitoring a large number of functions. As a result, the signal converter 30 and the high-speed integrator 32 are interconnected with each other by means of a scanner switch 34.

The switch 34 is interconnected with an output 33 from the comparator 22 to receive a synchronized gating signal. The gating signal normally retains the switch 34 to open. However, when the comparator 22 produces an error signal for the function controlled by the output means 10, the gating signal closes the switch 34 for a predetermined time interval. The constant current pulse signal from the converter 30 will pass through the switch 34 to the integrator 32.

It should be noted that separate signal output means 10 are provided for each function and a separate scanner switch 34 is provided in each output means 10. As a consequence, each output means 10 will respond only to the error signal representing the function controlled by the output means 10.

It has also been found desirable to employ a separate signal converter 30 for each output means 10. The gain of the various converters 30 may be varied to permit normalizing each of the error signals whereby the constant current signals for each output means 10 or control channel will have a predetermined maximum value.

The integrator 32 may be of any type suitable for integrating the current flow in the individual error signals. By way of example, the integrator 32 includes a condenser capable of storing and retaining a charge for an extended period of time. The condenser is connected to the switch 34 by a low resistance path to form a charging path having a very short time constant. When the switch 34 is closed and a constant current pulse is produced by the converter 30, the current will flow directly into the condenser at a high rate of speed and all of the charges in the current will be accumulated. Since the converter 30 includes a constant current source, the current flow into the condenser will be maintained constant throughout the signal. As a consequence, the charge stored in the condenser and the voltage thereacross will be a linear function of the duration of the current pulse from the converter 30 which in turn is proportional to the magnitude of the error signal.

The output of the high speed integrator 32 is interconnected with the input to an integrator 36 that is effective to accumulate a charge or integrate current and produce a continuous output current proportional thereto.

Although the integrator 36 may be of any desired variety, it has been found that a so-called solion cell similar to those manufactured and sold by the Self-Organizing Systems, Inc. is particularly well suited for this purpose. A solion cell is an electronic device which functions by controlling and monitoring a reversible electrochemical reaction in an electrolytic solution contained within the solion cell. The reaction employed is a so-called redox reaction wherein one or more of the constituents in the electrolytic solution is oxidized and reduced in response to the cumulative charge of current flowing through solion cell. The direction of the reaction is reversible in response to the direction of current flow.

The electrolytic solution is hermetically sealed inside of a suitable container. A pair of end electrodes are immersed in the electrolyte adjacent the opposite ends of the container. These end electrodes consist of an inert material such as platinum and do not deteriorate in the electrolyte. A shield electrode and a readout electrode also consisting of an inert material are disposed between the end electrodes. These electrodes effectively divide the interior of the capsule into three separate compartments. The shield and readout electrodes are perforated to permit the electrolyte nd the ions theerin to circulate between the compartments.

The compartment between the shield electrode and the first end electrode is commonly referred to as the reservoir and it constitutes the largest compartment. The compartment between the readout electrode and the second end electrode is commonly called the integral compartment. Normally, the integral compartment is made very small and an equilibrium distribution of ions within the integral compartment can be reached in a relatively short time. The compartment between the shield and the readout electrodes serves to separate these electrodes from each other. The electrolyte in all of the compartments contains both the oxidized and reduced species of an ion of the electrolyte.

The ions will flow between the reservoir and the integral compartment whenever a current flows between the two end electrodes. The amount of ions transferred will be an integral of the charging current that has flowed between the end electrodes. When a voltage is applied between the readout electrode and an end electrode, ions will be oxidized at one electrode and reduced at the same rate at the other electrode whereby a current will flow between the two electrodes. If the voltage between these electrodes is maintained somewhere within an extended range of values, the magnitude of the current flow in the readout electrode will be determined solely by the concentration of the ions within the integral compartment. As long as the ion concentration does not vary and a voltage is applied to the readout electrode, the current will remain constant.

As a consequence, the current flowing between the end electrode and the readout electrode is an integral of the current that has previously flowed between the two end electrodes. This is a completely reversible process whereby the charging current between the end electrodes may flow either way and the output current in the electrode can be increased or decreased as a result of the integral of the charging current increasing or decreasing.

The end electrodes of the solion cell are connected to the high-speed integrator 32 or the condenser therein. As a result, if an error current pulse occurs at the output of the signal converter 30 while the switch 34 is closed, the integrator 32 will instantly integrate the current in the pulse. The integrated signal or stored charge is then transferred from the high-speed integrator 32 into the low-speed integrator 36 or solion cell therein.

Each time that a digital signal flows from the integrator 32 to the integrator 36, the concentration of ions in the integral compartment of the solion cell will be varied in proportion to an integral of the current and also to the number of the pulses that were in the original voltage digital signal fed to the input 24. The polarity of the original signal will be effective to determine the direction of flow of current developed through the solion cell. Since the redox process in the solion cell is completely reversible, the resultant change in the ion concentration will reflect not only the number of pulses in the error signal, but also the polarity. It may thus be seen that by applying a voltage across the readout electrode and one of the end electrodes, an analog current will be produced in the readout electrode. Thus, current will persist from the integrator 36 as long as the voltage is applied and will have an amplitude that corresponds to the integral of the original digital signal.

Normally, there is a high degree of linearity between the total charge, i.e., the integral of current fed between the end electrodes and the current from the readout electrode. However, when the frequency of the current pulses supplied to a solion cell exceeds a predetermined level, the linearity tends to decrease with further increases in the frequency of the current. The high speed integrator 32 is effective to integrate the current in the short interval of time during which the error signal occurs. The path for discharging the current from the capacitor in the integrator 32 includes a suitable resistance to "stretch" the period for integrating to an interval on the order of time between successive error signals. This will insure the frequency of the signal being reduced into the linear range of a solion cell.

The signal out of the solion cell integrator 36 is a current that will have an amplitude proportional to the original digital signal supplied to the input 24 and will remain at this amplitude until a new charge is transferred from the high speed integrator 32. However, the amplitude of the current is normally very small, for example, in the range of about one milliampere. To increase the amplitude of the current signal to a more useful level, a current-to-voltage signal converter and amplifier 38 is provided.

In the event it is desirable to provide an output signal that is a current signal instead of a voltage signal, the amplifier 38 may be interconnected with a voltage-to-current signal converter 40. This stage 40 may also include amplifying means to further increase the amplitude of the signal.

The output from the amplifier 40 is connected to the control transducer 18 by means of a selector switch 42. When the movable contact of the switch 42 is placed against the fixed contact 44, the output or control signal from amplifier 40 is fed to the control transducer 18. The control signal is effective to vary the setting of the transducer 18 to modify the particular function controlled thereby.

When using the current signals from the amplifier 40 for controlling a regulator or control unit 18, it is frequently desirable to limit the maximum possible current to a value that will not overload the regulating or controlling device. In addition, it is also customary in control systems to limit the minimum current to some predetermined threshold level. As a consequence, a zero condition will be represented by a current equal to the threshold level and a zero current signal will be an unambiguous indication of a failure or malfunction.

To provide upper and lower limits for the output current, a suitable limiting section 46 is provided. The limiting section 46 is interconnected with the output of the current-to-voltage converter 38. The limiter 46 will thus receive a signal that is proportional to the integrated signal from the solion cell in the low speed integrator 36. The output of the limiter 46 is connected to the input of the integrator 36 so as to supply a current thereto. The limiter 46 is responsive to preset limits and if the signal from the converter 38 tends to exceed either a maximum or minimum limit, the limiter 46 will feed a current back into the solion cell 36. This will maintain the charge in the cell within predetermined bounds and thereby limit the extremes of the signal supplied to the switch 42.

When employing the portion of the control system described thus far, the pickup transducer 16 will sense the particular function and produce an analog function signal. This analog signal will be fed into the direct digital comparator 22 where it will be compared with a digital set-point signal corresponding to that particular function. This comparison produces a digital error signal proportional to the difference between the function and the set-point.

The digital error signal is fed to the signal converter 30 where it is converted into a constant current pulse having a time duration proportional to the magnitude of the error. This error signal is then fed through the scanner switch 34 and into the high-speed capacitive integrator 32 at a high rate of speed. The high-speed integrator 32 transfers the charge into the solion cell integrator 36 at a slow rate. The solion cell 36 will be effective to accept the transferred charge and produce a current that is proportional to the integral of the error. The period of time required to transfer the charge is on the order of the interval between successive error signals. However, the current from the integrator 36 will persist so long as the cell is energized and the charge supplied is not varied. Current from the integrator 36 is then fed through the amplifiers 38 and 40 to produce a control signal. The control signal is then fed through the switch 42 to the control transducer 18 so as to vary the magnitude of the function. Provided the control signal is within the limits permitted by the limiter 46, the magnitude of the control signal will gradually build up over an extended period of time until it is proportional to the error. Thus, the control signal will be a function of both the magnitude and the time duration of the error signal.

When this signal is used to control the action of the transducers 18, there is a gradual change of the function and a time delay in the change.

In the event it is desired to employ a control system wherein the signal is more nearly directly proportional to the error, the branch 28 is employed. This branch 28 includes a signal converter 50 interconnected with the output of the direct digital comparator 22. This converter 50 may be substantially identical to the converter 30 in the first branch 26. The converter 50 is effective to receive the voltage pulses forming the error signal and to convert them into a digital current pulse having a constant amplitude and a time duration proportional to the number of pulses in the error signal or to the time duration of the pulse train.

The output of the signal converter 50 is interconnected with a second scanner switch 52 that is substantially identical to the first scanner switch 34. The switch 52 is interconnected with one of the outputs 33 of the direct digital comparator 22. The output 33 is effective to open and close the switch 52 synchronously with the first switch 34 and during the interval the appropriate signal is present on the output 23. Thus, the constant current signal from the signal converter 50 will be permitted to pass through the scanner switch 52 only during those intervals when the direct digital converter 22 is producing an error signal for the function being regulated by the output means 10.

The output of the scanner switch 52 is interconnected with a high-speed integrator 54 adapted to receive the constant current pulse developed by the signal converter 50. This integrator 54 may be substantially identical to the integrator 32 and includes a condenser or similar device capable of accumulating all of the charge in the current flow from the converter 50. The charging path for accumulating the charge preferably has a very short time constant to permit its charging in less than the time duration of the error signal. The voltage of the charge accumulated on the condenser is proportional to the magnitude of the charge.

As will become apparent, this integrator 54 differs from the integrator 32 in the following respects. The integrator 32 transfers its stored charge to the integrator 36 at a relatively slow rate. As a consequence, the voltage of the charge in the integrator 32 gradually falls as the charge is transferred from the condenser. In contrast, it is desirable for the integrator 54 to maintain its voltage equal to the voltage to which it is initially charged. Accordingly, the integrator 54 normally has a capacity that is considerably greater than the capacity of the integrator 32 whereby the loss of a predetermined quantity of the charge will not materially reduce the voltage of the charge. This will provide a "memory" that retains the voltage of the stored charge at a nearly constant potential for extended periods of time even though small amounts of charge are removed.

The output of the integrator 54 is interconnected with one of the inputs 58 to a comparator amplifier 56. This amplifier 56 which is of conventional design includes two inputs 58 and 60 and a single output 62. The two inputs 58 and 60 are electrically separated from each other and are capable of receiving two entirely separate and independent signals. The comparator 56 compares the voltages of the two signals on the inputs 58 and 60 and produce a differential signal on the output 62. This signal has an amplitude and polarity determined by the difference between the magnitudes of the signals on the two inputs 58 and 60 and the polarity of the difference.

The output 62 of the comparator amplifier 56 is interconnected with a signal input 66 to a combination switch and constant current source 64. The switch 64 includes a gate or control input 68 which is effective to open and close the switch 64 and block or pass, respectively, the signal on the signal input 66. The control input 68 is interconnected with a suitable signal detector or zero sensor 70.

The zero sensor 70 is interconnected with the output 62 of the comparator 56 and is responsive to the magnitude of the difference signal. If a difference signal exists, the zero sensor 70 will supply a signal to the input 68 and maintain the switch 64 closed. This will allow the difference signal whatever its magnitude to pass. The switch 64 also includes a constant current source 64 that will maintain the output current equal to a constant amount whenever the switch is closed. Thus, irrespective of the amplitude of the difference signal supplied to the signal input, if a difference signal does exist, the current from the switch 64 will be constant. However, if the difference signal disappears or reaches zero, the sensor 70 will open the switch 64 and prevent any signal from the switch and current source 64.

It may thus be seen that the comparator 56 will compare the two signals on the two inputs 58 and 60 and if there is a difference signal the switch 64 will remain closed and permit the passage of the difference signal in the form of a constant current signal. However, when the signals on the two inputs 58 and 60 become equal and the difference signal disappears, the switch 64 will open and prevent any further charges or current to flow therefrom.

The output of the switch and current source 64 is interconnected with a low-speed integrator 72. This integrator 72 is effective to integrate the current supplied thereto and to continuously maintain an output signal having an amplitude proportional to the integral of the current. Accordingly, this integral 72 may be similar to the low-speed integrator 36 in that it also includes a solion cell. The two end electrodes of the cell are connected to the current source 64 whereby the electrolyte in the cell will be reduced or oxidized in proportion to the amount of current through the cell. The readout electrode will then be effective to produce a continuous output current which is proportional to the total charge supplied from the switch and current source 64.

The output of the solion cell or integrator 72 is interconnected with amplifying means which is effective to amplify the signal to a level suitable for actuating the control transducer 18. This amplifying means may be similar to the amplifying means in the first branch 26. More particularly, it includes a current-to-voltage converter and amplifier 74 and a voltage-to-current converter and amplifier 76. The first amplifier 74 is effective to convert the current signal into a voltage signal and amplify it to a more useful level. The second amplifier 76 is effective to again amplify the signal and to convert it into a current.

The output of the amplifier converter 76 is interconnected with the second fixed contact 78 in the switch 42. When the movable contact is moved against the fixed contact 78, the signal from the second branch 28 will be supplied to the control transducer 18 and actuate the transducer 18 and modify the function being monitored by the system.

The output of the current-to-voltage converter amplifier 74 is interconnected with the second input 60 to the comparator amplifier 56. It will thus be seen that a portion of the output signal is supplied to the amplifier 56 and is compared to the amplitude of the charge accumulated and stored in the high-speed integrator 54.

In the event there is a difference between the signal on the inputs 58 and 60, there will be a difference signal on the output 62. This signal will be sensed by the zero sensor 70 whereby a gating signal will maintain the switch open. The difference signal will then pass through the switch and current source 64 in the form of a constant current signal.

The current will then flow into the integrator 72 and into the solion cell therein. As the charge is accumulated in the solion cell, the amount of current flowing from the output of the cell will increase or decrease depending upon the polarity of the difference between the signals on the two inputs 58 and 60.

As the current from the solion cell in the low-speed integrator 72 changes, the current-to-voltage converter and amplifier 74 will convert the varying current signal into an amplified voltage signal that also has a changing amplitude. Although this signal is supplied to the voltage-to-current converter 76, a portion will be coupled back to the input 60 of the comparator amplitude 56 where it is compared with the signal from the high-speed integrator 54 and present on the input 58.

As the signal on the input 60 varies, its amplitude will approach the amplitude of the signal from high-speed integrator 54. Eventually, the amplitude of the varying signal will equal the amplitude of the signal on the input 58 and any difference therebetween will vanish.

The zero sensor 70 is responsive to this difference signal and provides an output or gate signal in response thereto. When the difference disappears, the zero sensor 70 will sense this zero condition and provide a gating signal that will open the switch 64. When the switch 64 opens, there will be no new current flowing into the solion cell to thereby vary its stored charge. As long as the switch 64 remains open, the charge will remain constant and the current from the integrator 72 will remain constant. The charge transferred into the integrator 72 is obtained from the source 64. As a consequence, little if any charge will be transferred from the high-speed integrator 54 during the comparison. It may thus be seen that when the charge in the integrator 72 provides a signal on the input 60 that equals the signal on input 58, the accumulated charge in the integrator 72 and the signal from the amplifier 76 will be directly proportional to the error signal.

When employing the control system while the switch 42 is set to actuate the branch 28, the pickup transducer 16 will sense the particular function being controlled and produce an analog function signal. This analog signal will be fed in to the direct digital comparator 22 where it will be compared with the digital set-point signal corresponding to that particular function. This comparison produces a digital error signal proportional to the difference between the function signal and the set-point signal.

The digital error signal is fed with input 24 to the signal converter 50 where it is converted into a constant current pulse or pulse train having a time duration proportional to the magnitude of the error. The error signal now in the form of a current signal, is then fed through the scanner switch 52 and into the high-speed integrator and memory 54 at a relatively high rate of speed. However, prior to supplying the charge to the integrator 54, any charge stored therein is first removed or cleared by an appropriate signal from the direct digital comparator 22. As a result, the integrator 54 stores a charge having a potential proportional to the magnitude of the error signal.

The comparator amplifier 56 is effective to compare the error signal present on input 58 with the feedback signal present on the input 60. If there is a difference between these two signals, the zero sensor 70 will keep the switch 64 closed and the difference signal will be coupled into the solion cell integrator 72. As the charge in the solion cell varies, the amplitude of the feedback signal to the input 60 will approach the magnitude of the signal on input 58. It will be noted that during this process, the charge supplied to the solion cell is supplied from the constant current source in switch 64. As a consequence, little if any charge will be removed from the integrator 54 whereby the voltage of the charge will remain substantially constant until an equilibrium condition is established. The output signal from the current-to-voltage converter 74 will then pass through the voltage-to-current converter 76, through the switch 42 and onto the control transducer 18. The next time that the direct digital comparator 22 samples the analog signal from the pickup transducer 16, the high-speed capacitor integrator 54 will be again cleared and charged whereby the foregoing process may be repeated.

It will be noted that the signal from the branch 26 corresponds to an integral of the error signal. As a result, the control signal applied to the control transducer 18 will result in a relatively gradual change in the amount of modification made to the function. However, the control signal produced in the branch 28 will be directly proportional to the error and as a consequence will produce a much more abrupt and rapid change in the control signal. Although both types of controls are suitable for certain types of operation, it has been found desirable under some circumstances to provide a control signal that is partially directly proportional to the error and partly proportional to an integral of the error. Under these circumstances, the output of the current-to-voltage converter 74 is interconnected with an input to the voltage-to-current converter 40 by means of a switch 80. When this switch 80 closes, both the integral control signal and the proportional control signal will be supplied to the voltage-to-current converter 40 where they will combine in some predetermined portions. By placing the movable contact in the switch 42 against the fixed contact 44, this combination signal will be supplied to the control transducer 18.

As an alternative, a switch 82 may be provided for interconnecting the output of the switch and current source 64 in branch 28 with the input to the low-speed integrator 36 in branch 26. This will permit the branch 28 to produce a feedback of the output signal to the input 60 so as to charge the solion cells in both the integrator 36 and the integrator 72 with quantities of current which are proportional to the magnitude of the error. Thus, the solion cell 36 will be charged in proportion to the error signal and to the integral of the error signal.

It will thus be seen that a control system has been provided which will be effective to sense the amount of error in a function and to provide control signals which are effective to actuate the control transducer and to maintain the function properly adjusted to reduce the error to a minimum amount.

While only a single embodiment of this control system is disclosed and described herein, it will be readily apparent to persons skilled in the art that numerous changes and modifications may be made thereto without departing from the spirit of the invention. For example, the direct digital comparator 22 may be replaced with any other means suitable for producing the required error signal. Also, the types of integrators including the solion cells therein may be replaced with equivalent devices. Accordingly, the foregoing disclosure of the present invention is for illustrative purposes only and does not in any way limit the present invention which is defined only by the claims which follow.

What is claimed is:

1. A control system for regulating a variable function at a predetermined amount, said system including the combination of:

set-point means providing a set-point signal proportional to said predetermined amount;

a pickup transducer responsive to the magnitude of the function and effective to provide a function signal proportional to the function;

an error detector electrically connected to the set-point means and to the pickup transducer, said error detector being responsive to the difference between the set-point signal and the function signal to provide an error signal;

first output means connected to the error detector and responsive to the error signal, said output means being effective to provide a first control signal proportional to the magnitude of the error signal;

second output means connected to the error detector and responsive to the error signal, said second output means being effective to provide a second control signal that is a function of the integral of the error signal; and a control transducer disposed in operative relation with the function to control the magnitude of the function, said control transducer being electrically interconnected with the first and second output means and responsive to the first and second control signals to vary the magnitude of the function to reduce the error signal to zero.

2. A control system for maintaining a variable function at a predetermined amount, said control system including the combination of:

a pickup transducer responsive to the magnitude of the function and effective to provide a function signal proportional to the magnitude of the function;

set-point means effective to provide a set-point signal proportional to the predetermined amount;

an error detector electrically connected to the pickup transducer and to the set-point means, said error detector being effective to compare the function signal with the set-point signal and provide an error signal proportional to the difference between the two signals;

output means interconnected with the error detector and responsive to the error signal, said output means having a first branch effective to provide a first resultant signal proportional to the integral of the error signal and a second branch effective to provide a second resultant signal proportional to the magnitude of the error signal;

means electrically connected to the two branches and effective to combine the first and second resultant signals and provide a control signal;

a control transducer electrically connected to the last means and responsive to the control signal; and said control transducer being disposed in operative relation with the function and effective to control the magnitude of the function in response to the control signal.

3. A control system for regulating a variable function at a predetermined amount, said system including the combination of:

set-point means providing a set-point signal proportional to said predetermined amount;

a pickup transducer responsive to the magnitude of the function and effective to provide a function signal proportional to the function;

an error detector connected with the set-point means and the pickup transducer, said error detector being responsive to the difference between the set-point signal and the function signal and effective to provide an error signal;

a signal comparator having a pair of inputs and an output, said comparator being responsive to the difference between the signals on the inputs to provide a difference signal on the output only whhen the signals on the inputs are unequal;

means connecting the first input to said error detector to maintain the first input at a potential proportional to the error signal;

storage means connected to the output of said signal comparator to accumulate a charge only when there is a difference signal on the output, said storage means being effective to provide a control signal proportional to the accumulated charge;

means connecting the storage means with the second input to maintain the second input at a potential proportional to the control signal; and a control transducer disposed in operative relation with the function to control the magnitude of the function, said control transducer being electrically interconnected with the storage means and responsive to the control signal to vary the magnitude of the function to reduce the error signal to zero.

4. A control system for regulating a variable function at a predetermined amount, said system including the combination of:

set-point means providing a set-point signal proportional to said predetermined amount;

a pickup transducer responsive to the magnitude of the function and effective to provide a function signal proportional to the function;

an error detector connected with the set-point means and the pickup transducer, said error detector being responsive to the difference between the set-point signal and the function signal and effective to provide an error signal having a time duration that is proportional to the difference;

constant current means interconnected with the error detector, said means being responsive to the error signal to produce a constant current having a time duration substantially equal to the duration of the error signal;

storage means interconnected with the constant current means and effective to accumulate a charge having a potential proportional to the amount of said current;

a signal comparator having a pair of inputs and an output, said comparator being responsive to the difference between the signals on the inputs to provide a difference signal on the output only when the signals on the inputs are unequal;

means connecting the first input to said storage means to maintain the first input at a potential proportional to the accumulated charge;

current means connected to the output of said signal comparator to accumulate a charge only when there is a difference signal on the output, said current means being effective to provide a control signal proportional to the charge;

means connecting the current means with the second input to maintain the second input at a potential proportional to the control signal; and a control transducer disposed in operative relation with the function to control the magnitude of the function, said control transducer being electrically interconnected with the storage means and responsive to the control signal to vary the magnitude of the function to reduce the error signal to zero.

5. A control system for maintaining a variable function at a predetermined amount, said control system including the combination of:

set-point means effective to provide a set-point signal proportional to the predetermined amount;

a pickup transducer responsive to the magnitude of the function to provide a function signal proportional to the actual magnitude of the function;

an error detector connected to the pickup transducer and to the set-point means, said error detector being effective to compare the function signal with the set-point signal to produce an error signal proportional to the difference between the signals;

a first storage means interconnected with the error detector and effective to accumulate a charge proportional to the integral of the error signal;

a solion cell interconnected with the first storage means, said first storage means being effective to transfer the charge stored therein to the solion cell, said solion cell being effective to provide a first resultant signal proportional to the amount of charge accumulated therein;

second storage means interconnected with the error detector and effective to accumulate a charge having a potential proportional to the error signal;

a second solion cell effective to accumulate a charge and produce a second resultant signal proportional to the amount of charge accumulated in the cell;

means connected to the second storage means and to the second solion cell to transfer a charge into the second solion cell proportional to the potential of the charge in the second storage means;

a control transducer disposed in operative relation with the function to control the magnitude of the function in response to a control signal; and means electrically connected to the solion cell to combine the two resultant signals to provide a control signal, said last means being electrically interconnected with the control transducer to supply the control signal to the control transducer.

6. A control system for maintaining a variable function at a predetermined amount, said control system including the combination of:

set-point means effective to provide a set-point signal proportional to the predetermined amount;

a pickup transducer responsive to the magnitude of the function to provide a function signal proportional to the actual magnitude of the function;

an error detector connected to the pickup transducer and to the set-point means, said error detector being effective to compare the function signal with the set-point signal to produce an error signal proportional to the difference between the signals;

storage means interconnected with the error detector and effective to accumulate a charge having a potential proportional to the error signal;

a solion cell effective to accumulate a charge and produce a control signal proportional to the amount of charge accumulated in the cell;

means connected to the storage means and to the solion cell to transfer a charge into the solion cell proportional to the potential of the charge in the storage means;

a control transducer disposed in operative relation with the function to control the magnitude of the function in response to a control signal; and means electrically connected to the solion cell and to the control transducer to supply the control signal to the control transducer.

7. A control system for maintaining a variable function at a predetermined amount, said control system including the combination of:

set-point means effective to provide a set-point signal proportional to the predetermined amount;

a pickup transducer responsive to the magnitude of the function to provide a function signal proportional to the actual magnitude of the function;

an error detector connected to the pickup transducer and to the set-point means, said error detector being effective to compare the function signal with the set-point signal to produce an error signal proportional to the difference between the signals;

storage means interconnected with the error detector and effective to accumulate a charge having a potential proportional to the error signal;

signal comparing means having two inputs and one output, said signal comparing means being effective to compare the potentials on the inputs to provide a first difference signal when the two potentials are equal and to provide a second difference signal when the two potentials are unequal;

means interconnecting the storage means with one input to maintain the input at the potential of the stored charge;

a solion cell effective to accumulate a charge and produce a signal proportional to the amount of charge accumulated in the cell;

charging means connected to the output and the solion cell to transfer a charge into the solion cell only in response to the second difference signal;

means connected to said solion cell and the second input to maintain the second input at a potential proportional to the control signal and to disable the charging means when the potentials on the two inputs are equal and the second difference signal disappears;

a control transducer disposed in operative relation with the function to control the magnitude of the function in response to a control signal; and said solion cell being electrically interconnected with the control transducer to supply the control signal to the control transducer.

8. Apparatus for converting a digital error signal from a source into an analog control signal having an amplitude proportional to a digital signal, said apparatus including the combination of:

signal converting means electrically connected to the signal source;

constant current means in said signal converter to provide a constant current having a time duration proportional to the magnitude of the digital error signal;

storage means interconnected with constant current means for receiving the charging current and accumulating a charge having a potential proportional to integral of the charging current;

a signal comparator having a pair of inputs and an output, said signal comparator being effective to compare the potential on the two inputs and to provide a first difference signal on the output when the potentials on the two inputs are equal and a second difference signal when the potentials on the two inputs are unequal;

means interconnecting the first of said inputs with the storage means to maintain the first input at the potential of said charge;

charging means interconnected with the output of the signal comparator and responsive to the difference signal, said charging means being effective to supply a charging current only when the second difference signal is present on the output;

a solion cell having an input electrode and an output electrode, said input electrode being interconnected with the charging means and effective to accumulate a charge proportional to the integral of the second charging current, said output electrodes being effective to provide a control signal proportional to the charge accumulated in the solion cell; and means interconnecting the output electrode with the second of the inputs to said signal comparing means to maintain the second input at a potential proportional to the control signal.

9. Apparatus for converting a digital error signal from a source into an analog control signal having an amplitude proportional to a digital signal, said apparatus including the combination of:

signal converting means electrically connected to the signal source and effective to convert the digital error signal into a charging current proportional to the digital error signal;

storage means connected to the signal converter for receiving the charging current and accumulating a charge proportional to the charging current;

a signal comparator having a pair of inputs and an output, said signal comparator being effective to compare the signals on the two inputs and to provide a first difference signal on the output when the signals on the two inputs are equal and a second difference signal when the signals on the inputs are unequal;

means interconnecting the first of said inputs with the storage means to maintain said input at a potential proportional to the potential of said charge;

charging means interconnected with the output of the signal comparator and responsive to the difference signal, said charging means being effective to supply a charging current only when the second difference signal is present on the output;

a solion cell having an input electrode and an output electrode, said input electrode being interconnected with the charging means and effective to accumulate a charge proportional to the integral of the second charging current and to provide a control signal on the output electrode proportional to the accumulated charge; and means interconnecting the output electrode with the second of the inputs to said signal comparing means to supply the control signal thereto.

10. Apparatus for converting an error signal from a source into a control signal having an amplitude proportional to the error signal, said apparatus including the combination of:

storage means electrically connected to the signal source for receiving the error signal, said storage means including means for accumulating a charge proportional to the magnitude of the error signal;

a signal comparator having a pair of inputs and an output, said signal comparator including means effective to compare the potentials on the two inputs and to provide a difference signal on the output only when the potentials on the two inputs are unequal;

means interconnecting the first of said inputs with the storage means to maintain the input at a potential proportional to the accumulated charge;

charging means interconnected with the output of the signal comparator and responsive to the difference signal, said charging means being effective to supply a charging current only when said difference signal is present on the output;

a solion cell having an input electrode and an output electrode, said input electrode being interconnected with the charging means and effective to accumulate a charge proportional to the integral of the charging current from the charging means, said output electrode being effective to provide a control signal proportional to the charge accumulated in the solion cell; and means connecting the output electrode with the second of the inputs to said signal comparing means to maintain the second input at a potential proportional to the control signal.

11. Apparatus for converting an error signal from a source into a control signal having an amplitude proportional to the error signal, said apparatus including the combination of:

a signal comparator having a pair of inputs and an output, said signal comparator including means effective to compare the signals on the two inputs and to provide a first difference signal on the output when the signals on the two inputs are equal and to provide a second difference signal when the two signals on the two inputs are unequal;

means electrically connected to the signal source for receiving the error signal and with the first of the inputs to said signal comparator to maintain the first input at a potential proportional to the magnitude of the error signal;

charging means interconnected with the output of the signal comparator and responsive to the difference signals, said charging means being effective to supply a charging current only when the second difference signal is present on the output;

a solion cell having an input electrode and an output electrode, said input electrode being interconnected with the charging means and effective to accumulate a charge proportional to the integral of the charging current supplied to the input electrode from the charging means and to provide a control signal on the output electrode proportional to the accumulated charge; and means interconnecting the second of the inputs to said signal comparing means with the output electrode from the solion cell to supply the control signal to said other input.

12. Apparatus for converting an error signal from a source into a control signal proportional to the error signal, said apparatus including the combination of:

a signal comparator having a pair of inputs and a single output, said signal comparator including means effective to compare the signals on the two inputs and to provide a first difference signal on the output when signals on the two inputs are equal and to provide a second difference signal on the output when the signals on the two inputs are unequal;

means electrically connected with the signal source for receiving the error signal and with the first of the inputs to said signal comparator to maintain the input at a level proportional to the error signal;

charging means interconnected with the output of the signal comparator to supply a charging current only when the second difference signal is present on the output;

means electrically interconnected with the charging means to accumulate a charge in response to the charging current from the charging means, said last means being effective to provide a continuous control signal proportional to the accumulated charge; and means connecting the other input of said signal comparing means with the last means to supply the control signal to the signal comparator for comparison with the error signal on the first input.

13. Apparatus for converting an error signal from a source into a control signal proportional to the error signal, said apparatus including the combination of:

first storage means electrically connected with the signal source for receiving the error signal and accumulating a charge proportional to the error signal;

a signal comparator having a pair of inputs and an output, said signal comparator including means effective to compare the signals on the two inputs and to maintain the output at a first level when the signals on the inputs are equal and to maintain the output at a difference level when the signals on the input are unequal;

charging means interconnected with the output of the signal comparator, said charging means being effective to supply a charging current only when the output is maintained at the difference level;

second storage means electrically interconnected with the charging means for accumulating a charge proportional to the integral of the charging current from the charging means; and one of the inputs to said signal comparing means being connected with the first storage means and the other of said inputs being connected to the second storage means, said comparator being effective to compare the charges stored in the storage means and to maintain the output thereof at said first level to thereby disable the charging means and prevent further charging of the second storage means when the signals on said inputs are equal.

14. Apparatus for converting an error signal from a source into a control signal proportional to the error signal, said apparatus including the combination of:

first storage means for being electrically connected with the signal source for receiving the error signal therefrom, said storage means being effective to accumulate a charge proportional to the magnitude of the error signal;

signal comparing means having a pair of inputs and an output, said signal comparing means being effective to compare the signals on the two inputs and to provide a difference signal on the output only if there is a difference between the signals on the two inputs;

second storage means electrically interconnected with the output of the signal comparing means to accumulate a charge only in response to the difference signal, said second storage means being effective to provide a control signal proportional to the charge accumulated by the second storage means; and one of the inputs to said signal comparing means being electrically interconnected with the first storage means and the other of the inputs to said signal comparing means being electrically interconnected with the output of the second storage means.

15. Apparatus for converting an error signal from a source into a control signal proportional to the error signal, said apparatus including the combination of:

signal comparing means having a pair of inputs and an output, said signal comparing means being effective to compare the signals on the two inputs and to provide a difference signal on the output;

storage means electrically connected with the output of the signal comparing means to accumulate a charge in response to the difference signal, said storage means having an output to provide a control signal proportional to the charge accumulated by the storage means;

means for connecting one of the inputs of said signal comparing means with the source of said error signal;

means connecting the other input of said signal comparing means with the output of the storage means; and means electrically connected to the output of said signal comparing and the storage means, said last means being responsive to the difference signal and effective to transfer a charge to the storage means when the signals on the two inputs are unequal.

References Cited

UNITED STATES PATENTS

| | | | |
|---|---|---|---|
| 2,537,427 | 1/1951 | Seid et al. | 340—347 |
| 2,953,773 | 9/1960 | Di Nicolantonio | 340—347 |

DARYL W. COOK, *Acting Primary Examiner.*

MAYNARD R. WILBUR, *Examiner.*

W. J. KOPACZ, *Assistant Examiner.*